Jan. 15, 1952 G. B. BONA 2,582,581
APPARATUS FOR JOINING ENDS OF THERMOPLASTIC FILM
Filed Sept. 9, 1948 2 SHEETS—SHEET 1

INVENTOR.
GEORGE B. BONA
BY
Blair, Curtis & Hayward

Jan. 15, 1952  G. B. BONA  2,582,581
APPARATUS FOR JOINING ENDS OF THERMOPLASTIC FILM
Filed Sept. 9, 1948  2 SHEETS—SHEET 2
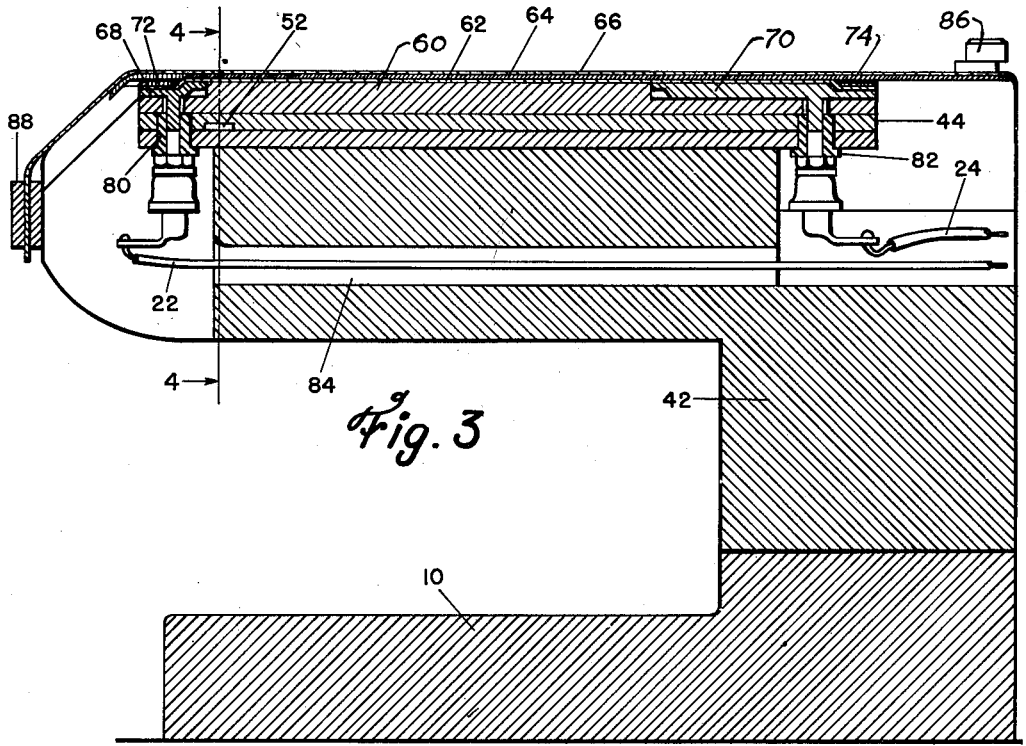
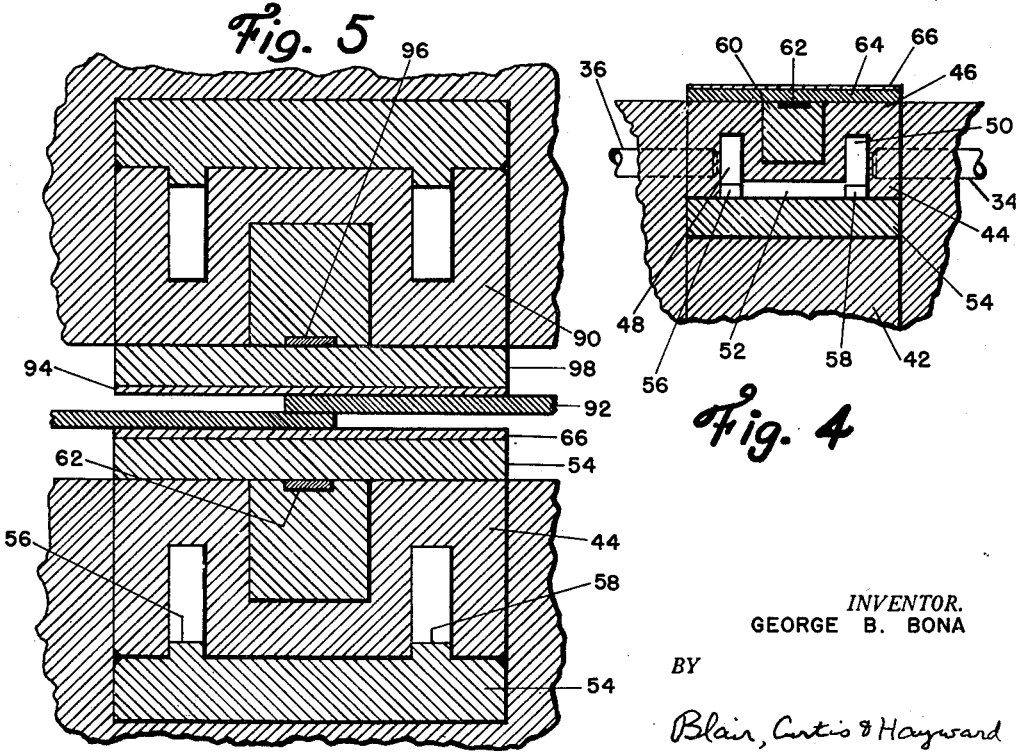
INVENTOR.
GEORGE B. BONA
BY
Blair, Curtis & Hayward

Patented Jan. 15, 1952

2,582,581

UNITED STATES PATENT OFFICE 2,582,581

APPARATUS FOR JOINING ENDS OF THERMOPLASTIC FILM

George B. Bona, Bridgeport, Conn., assignor to Dictaphone Corporation, Bridgeport, Conn., a corporation of New York Application September 9, 1948, Serial No. 48,512

5 Claims. (Cl. 154—42)

This invention relates to a method and apparatus for joining free ends of thermoplastic film, e. g. ethyl cellulose films, in the form of strips, sheets or the like. The present method and apparatus are particularly well adapted to be used in making endless plastic belt records for sound recording purposes and will be illustratively described as applied to this problem; although as the description proceeds it will become apparent that the method and apparatus are broadly applicable to the welding of thermoplastic films for a variety of purposes.

The welding of thermoplastic films that are to be used for sound recording purposes presents certain special problems. In many applications where plastic films are welded, a considerable degree of unevenness and irregularity at the welded seam is tolerable. For example, when plastic films are used for packaging, irregularity of the seam may detract from the appearance of the package but presents no serious disadvantage from a functional standpoint. In the case of sound recording media, on the other hand, the welded seam must have a high degree of smoothness and uniformity since any irregularity in the film tends to distort the sound track, introduce noise, and detract from the quality of sound reproduction. It is also necessary, of course, that a film bond be established between the pieces of thermoplastic material.

It is accordingly an object of the present invention to provide an improved method of welding thermoplastic materials. It is another object of the invention to provide a method of making a welded endless belt for sound recording purposes that has a seam which is exceptionally smooth and uniform. It is another object of the invention to provide apparatus useful in carrying out the method of the invention. Other objects of the invention will be in part obvious and in part pointed out hereafter.

The many objects and advantages of the present invention may best be understood and appreciated by reference to the accompanying drawings which illustrate apparatus incorporating a preferred embodiment of the apparatus invention and capable of carrying out the method of the invention. In the drawings:

Figure 3 is a central longitudinal section through the lower fixture taken on the line 3—3 of Figure 2 showing the manner of assembly of the various parts comprising the lower fixture;

Figure 4 is a vertical section taken on the line 4—4 of Figure 3 and particularly showing the cooling water channel of the lower fixture; and Figure 5 is a transverse vertical section through the central portions of the upper and lower fixtures in pressing position to show the manner in which they effect a weld between the free ends of a thermoplastic film.

Figure 1:
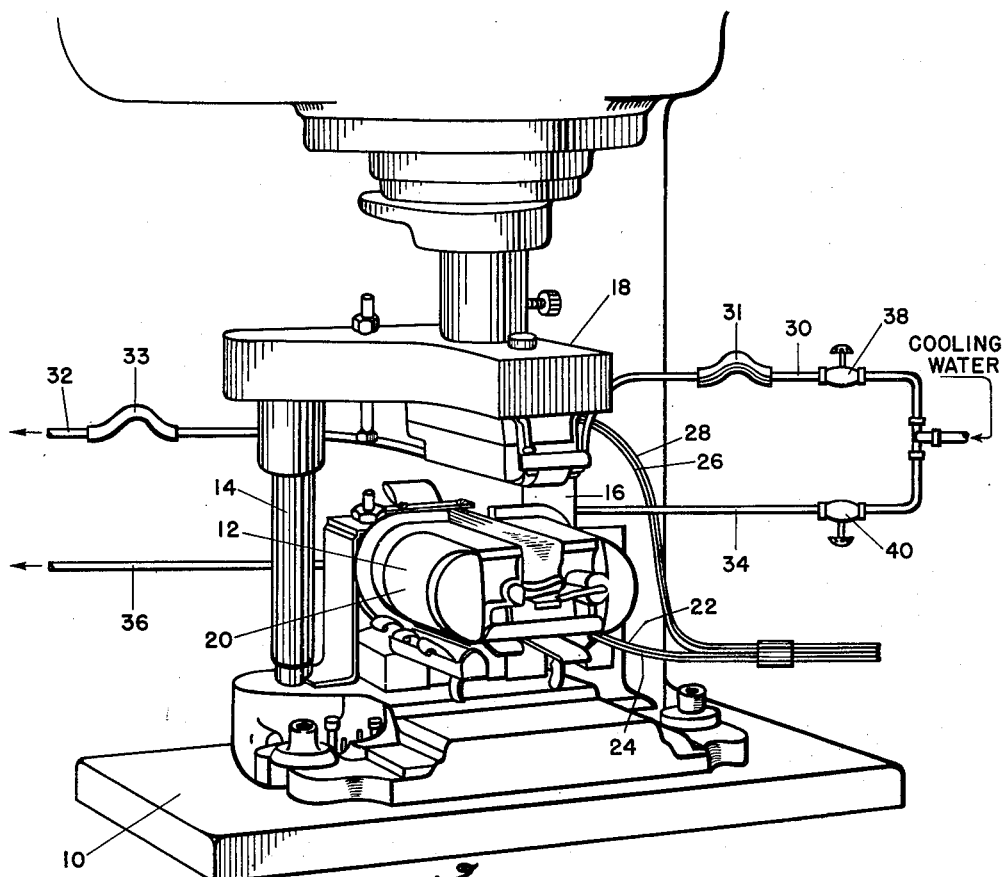
Figure 1 is a perspective view of a press incorporating the present apparatus invention and adapted to be used in making endless thermoplastic belts in accordance with the method of the invention.

In one of its broader aspects, the present method of joining free ends of thermoplastic film comprises the steps of placing the free ends in juxtaposed position between two thin layers of a relatively high thermal conductivity material having a smooth film-contacting surface; placing two layers of a low thermal conductivity material against the high thermal conductivity layers, and applying heat and pressure to the outer surfaces of the low conductivity layers to fuse the ends of the thermoplastic material together. The high and low conductivity layers cooperate in such manner as to regulate the heat supply to the juxtaposed ends of the film to produce an unusually uniform joint. By using the combination of high and low thermal conductivity materials, localized over-heating of portions of the joint is avoided since the low conductivity material retards somewhat the flow of heat to the joint and thus enables the high conductivity material to maintain a substantially uniform temperature over the area of the film that is being welded. As indicated above the present method may be carried out with advantage by using the apparatus shown in the drawings.

Referring to the drawings and more particularly to Figure 1, the press there shown comprises a base 10 on which is mounted a lower fixture generally designated 12. The base 10 supports a pair of posts 14 and 16 on which there is slidably mounted an upper fixture, generally designated 18, which is adapted to be moved downwardly and pressed against the lower fixture 12. The lower fixture 12 comprises an oval mandrel 20 around which a strip of thermoplastic material may be wrapped in such manner that its free ends overlap at the top center of the mandrel in position to be welded.

The fixture 12 is provided with an electrical resistance heating element (described in detail below) and energy for this element is supplied to the fixture through conductors 22 and 24 from a suitably controlled source. In like manner energy is supplied through conductors 26 and 28 to the heating element of the upper fixture 18. In order to limit the application of heat to the desired areas of the film, portions of each fixture are cooled with water as described below. To effect this cooling, water is supplied through the conduit 30 to the fixture 18 and is withdrawn through conduit 32. In like manner water is supplied to the lower fixture 12 through conduit 34 and withdrawn through conduit 36. The flow of water to the upper and lower fixtures is regulated by the valves 38 and 40 respectively. The conduits 30 and 32 include sections of rubber hose 31 and 33 respectively to permit vertical movement of fixture 18.

Referring now to Figures 3, 4 and 5, mounted on the base 10 there is a heater assembly supporting block 42 which, as shown in Figure 4, is recessed to receive the heater assembly unit 44. The unit 44 comprises a channel member 46 having the longitudinal channels 48 and 50 and the transverse or cross-channel 52 which interconnects the channels 48 and 50 near one end thereof. The channel member 46 is provided with a cover plate 54 having a pair of projecting ridges 56 and 58 that extend respectively into the channels 48 and 50 to position the cover plate properly with respect to the channel member and to assist in sealing the channels.

The upper central portion of the channel member 46 is recessed to receive an elongated insulating block 60 which may be made of an asbestos insulating board such as that sold under the tradename "Transite" and which is in turn recessed to receive the electrical resistance heating element 62. As shown in Figure 4 the tops of the channel member 46, the block 60 and the heating element 62 are flush with one another and are surmounted by a layer 64 of a material of low thermal conductivity e. g. mica. The mica layer 64 may be either a single strip or several strips. Overlying the mica layer 64 there is a strip 66 of metal foil having a smooth upper surface adapted to bear against the juxtaposed ends of the film that is to be welded.

Referring particularly to Figure 3, the insulating block 60 is cut away at its ends to receive the electrical terminals 68 and 70 that are held firmly against the terminals by the clamping strips 72 and 74 which (see Fig. 2) are fixed to the channel member 46 by the screws 76 and 78 respectively. Reverting to Figure 3 the terminals 68 and 70 extend downwardly through the holes 80 and 82 of the heater assembly 44 and at their lower ends are connected to the conductors 22 and 24 respectively through which, as previously described, the heating element 62 is energized. The block 42 is provided with a passage 84 through which the conductor 22 passes to a point adjacent conductor 24. The metal foil 66 extends beyond the ends of mica layer 64 and heating element 62 and is held in place at its ends by the clamping members 86 and 88.

The arrangement of the parts in pressing position is indicated in Figure 5. As shown, the upper fixture 18 has a heater assembly unit 90 which is constructed similarly to the heater assembly unit 44 of the lower fixture and includes a heating element 96, mica layer 98 and metal foil 94 having a smooth surface that bears against the lap 92 of the film that is to be welded.

In carrying out the present method, the plastic film to be welded is wrapped around the mandrel 20 and its free ends positioned to form the lap 92. The upper fixture is then lowered to cause the lap 92 to be pressed between the metal foil 94 of the upper unit 90 and the foil 66 of lower unit 44, after which the heating element 62 of unit 44 and heating element 96 of unit 90 are energized to fuse the lap 92 under pressure and to cause the ends of the strip of film to be welded together to form an endless belt. As described above, the mica layers 54 and 98 retard somewhat the flow of heat from heating elements 62 and 96 to metal foils 66 and 94 and thus permit the foils to distribute the heat in an effectively uniform manner to the portions of the film that are to be heated. Hence mica layers and metal foils cooperate to prevent localized overheating which would tend to produce a distorted or irregular seam.

Figure 2:
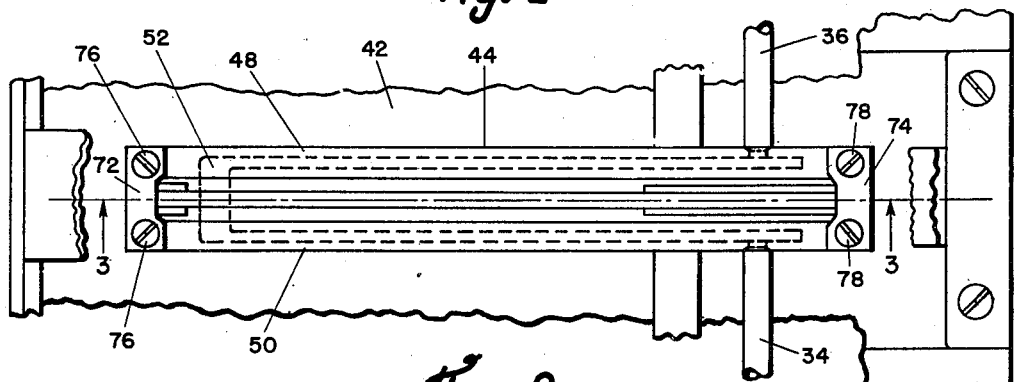
Figure 2 is a top view of the central portion of the lower fixture of the press shown in Figure 1, broken away to show the mounting of the heating element.

As indicated above, the heater assembly units are water-cooled in order to prevent undesired heating of the fixtures and those portions of the film that are not to be welded. Referring particularly to Figures 2 and 4, water is admitted to the unit 44 and more particularly the channel 50 through pipe 34, flows along the unit 44, through cross-channel 52, back along channel 48 and leaves the unit through pipe 36. In like manner the heater assembly unit 90 is provided with cooling water channels to which (see Fig. 1) cooling water is supplied through pipe 30 and from which cooling water is withdrawn through pipe 32.

Although the materials of construction and sizes of the parts of the present apparatus do not appear to be critical, certain materials and sizes have been found to be particularly satisfactory when welding ethyl cellulose film of approximately .006 in. thickness. In welding film of this type good results were obtained by using for heating elements 62 and 96 a platinum ribbon about .003 in. thick and .125 in. wide surmounted by a mica layer .012 in. thick and a metal foil .003 in. thick. The metal foil was made of an alloy composed essentially of nickel and iron and containing about 36% nickel. An alloy of this type is sold under the trade-name "Nilvar." It was found that with this structure ethyl cellulose belts could be formed by welding so that the resulting seams, after the edges of the belt had been trimmed at the seam, were virtually undetectable by visual inspection.

From the foregoing description it should be apparent that the present method and apparatus are capable of achieving the objects set forth above. The use of a combination low thermal conductivity and high thermal conductivity materials interposed between a heating element and a film to be welded provides exceptionally uniform heat distribution over the welding area and prevents substantially completely uneven heating of the belt which might cause unequal shrinkage and distortion. Thus a thermoplastic film can be welded to provide an endless belt that, for practical purposes, may be considered seamless, in that when it is used for sound recording purposes and the recording characteristics of the belt are the same at the seam as at any other point on the surface of the belt.

Since many embodiments might be made of the present invention and since many changes might be made in the embodiment disclosed herein, it is to be understood that the foregoing description is to be interpreted as illustrative only and not in a limiting sense.

I claim:

1. Apparatus for joining juxtaposed free ends of thermoplastic film, comprising a pair of cooperating pressure members for exerting pressure on opposite sides of said juxtaposed ends of said film, at least one of said pressure members including a base, a heating element mounted thereon, a thin layer of a low thermal conductivity material overlying said heating element and a thin layer of a high thermal conductivity material overlying said low conductivity material and having a smooth film-contacting surface, said low and high thermal conductivity layers being effectively secured to said base.

2. Apparatus for joining juxtaposed free ends of thermoplastic film, comprising a pair of cooperating pressure members for exerting pressure on opposite sides of said juxtaposed ends of said film, each of said pressure members including a base, a heating element mounted thereon, a thin layer of a low thermal conductivity material overlying said heating element and a thin layer of a high thermal conductivity material overlying said low conductivity material and having a smooth film-contacting surface, said low and high thermal conductivity layers being effectively secured to said base.

3. Apparatus for joining juxtaposed free ends of thermoplastic film, comprising a pair of cooperating pressure members for exerting pressure on opposite sides of said juxtaposed ends of said film, at least one of said pressure members including a base, a heating element mounted thereon, a thin layer of a low thermal conductivity material overlying said heating element and a layer of metal foil overlying said low conductivity layer, said low thermal conductivity layers and metal foil being effectively secured at their ends to said base.

4. Apparatus for joining juxtaposed free ends of thermoplastic film, comprising a pair of cooperating pressure members for exerting pressure on opposite sides of said juxtaposed ends of said film, at least one of said pressure members including a base, a heating element mounted thereon, a thin layer of mica overlying said heating element and a layer of metal foil overlying said mica, said metal foil and mica being effectively secured to said base.

5. Apparatus for joining juxtaposed free ends of thermoplastic film, comprising a pair of cooperating pressure members for exerting pressure on opposite sides of said juxtaposed ends of said film, at least one of said pressure members including a base having an annular cooling channel formed therein and inlet and outlet connections for said cooling channel, a heating element centrally mounted on said base, a thin layer of mica overlying said heating elements and secured to said base, and a layer of metal foil overlying said mica and effectively secured to said base.

GEORGE B. BONA.

REFERENCES CITED

The following references are of record in the file of this patent:

UNITED STATES PATENTS

| Number | Name | Date |
| --- | --- | --- |
| 1,940,599 | Marrison | Dec. 19, 1933 |
| 1,997,268 | Scharpf | Apr. 9, 1935 |
| 2,289,618 | Young | July 14, 1942 |
| 2,460,460 | Langer | Feb. 1, 1949 |